United States Patent
Ochoa et al.

[11] Patent Number: 6,012,211
[45] Date of Patent: Jan. 11, 2000

[54] WHEEL PULLER

[76] Inventors: Sandy Ochoa; Justin J. Ochoa, both of 505 24th St., Bldg. 3, Alamogordo, N.Mex. 88310

[21] Appl. No.: 09/183,261

[22] Filed: Oct. 30, 1998

[51] Int. Cl.[7] ..................................................... B23P 19/04
[52] U.S. Cl. ............................. 29/426.5; 29/244; 29/256; 29/259
[58] Field of Search ............................. 29/244, 245, 256, 29/259, 426.5

[56] References Cited

U.S. PATENT DOCUMENTS

| | | | |
|---|---|---|---|
| 1,258,699 | 3/1918 | Neumaier | 29/261 |
| 1,426,835 | 8/1922 | Mohrman | 29/261 |
| 1,534,350 | 4/1925 | Bassett | 29/261 |
| 1,589,015 | 6/1926 | Lee | 29/261 |
| 1,594,418 | 8/1926 | Riberdy | 29/261 |
| 1,975,773 | 10/1934 | Davis | 29/84 |
| 2,191,021 | 2/1940 | Ladd | 29/85 |
| 2,296,119 | 9/1942 | Ringrose | 29/85 |
| 3,402,455 | 9/1968 | Converse | 29/261 |
| 3,689,978 | 9/1972 | Kelso | 29/259 |
| 4,042,139 | 8/1977 | Pernsteiner et al. | 214/331 |
| 4,287,653 | 9/1981 | Bloch | 29/256 |
| 4,729,157 | 3/1988 | McCue | 29/426.5 |
| 4,771,528 | 9/1988 | Stromberg | 29/259 |
| 4,771,531 | 9/1988 | Asher | 29/426.3 |
| 4,908,925 | 3/1990 | Johnson | 29/260 |
| 4,989,312 | 2/1991 | Maddelena | 29/259 |
| 5,170,548 | 12/1992 | Ramirez | 29/264 |
| 5,341,553 | 8/1994 | Herzhauser | 29/261 |
| 5,390,404 | 2/1995 | Rubino et al. | 29/259 |
| 5,479,688 | 1/1996 | Rubino et al. | 29/259 |

*Primary Examiner*—David P. Bryant
*Assistant Examiner*—Essama Omgba
*Attorney, Agent, or Firm*—Dennis F. Armijo

[57] ABSTRACT

A wheel pulling apparatus and method for removing vehicle wheels by pushing against the mounting studs of a motor vehicle wheel assembly. The invention is designed to remove or break uni-mount wheels from large wheel assemblies. A push plate is positioned onto the wheel by at least one receiver. At least two threaded grappling hooks are affixed to the wheel, and the threaded portion of the grappling hooks are slid through slots in the push plate. Washers are inserted and nuts are tightened onto the threaded portion. The nuts are then alternately tightened causing the push plate to snug onto mounting studs and to pull the wheel from the wheel assembly.

11 Claims, 2 Drawing Sheets

WHEEL PULLER

BACKGROUND OF THE INVENTION

1. Field of the Invention (Technical Field)

The invention relates to wheel pullers and more particularly to an apparatus and method for detachment or removal of uni-mount steel and aluminum wheels from vehicles.

2. Background Art

With the advent of the new uni-mount wheels there is a need for a wheel puller that can easily remove a steel or aluminum rim or wheel from its hub. Due to the close tolerances in matching a wheel to a hub coupled with corrosion and debris that further wedges a wheel to a hub during normal use, removal of these wheels poses a problem. This problem is primarily limited to aluminum wheels on steel hubs and is especially prevalent to removal of the inside wheel in a dual wheel configuration.

There is one prior art wheel puller on the market that addresses this problem with a dedicated wheel pulling machine, entitled the Wheel Whiz™. This wheel pulling device operates on the same principle of most prior art mechanical and automotive pullers. These devices use grappling prongs or hooks fastened to the desired object to pull it in the opposite direction of a working screw pushing from a single point, and therefore remove or pull the object from its former position. This particular wheel puller employs the use of five or more T-type hooks on the ends of adjustable lengths of chain for grappling onto the wheel. These are fastened to a disk section, with one chain and hook at the end of each of five evenly spaced eye hooks on the disk, with the hooks extending away from the disk and fastened into the existing holes in the wheel. The disk and hook work in conjunction with a working screw located in the center of the disk. The working screw, driven by an air operated impact wrench, moves in a direction parallel but opposite to the pull of the chains, and serves to give outward linear motion to the disk and hook sections, thus pulling the wheel from the hub. In order to avoid damage to the hub, a cup shape device is affixed to the end of the working screw. There are several different sizes of hubs, therefore several different cup devices are necessary to accommodate the different truck hub centers. The entire apparatus is then supported by a frame and roller system that allows the tool to be maneuvered into a working position in front of the wheel and hub. This frame further employs an up and down function by use of a jack that maneuvers the entire pulling apparatus to the desired working height.

U.S. Pat. No. 4,042,139 to Pernsteiner et al. is a large truck wheel puller that uses a hydraulic operated piston that engages with the axle hub causing the lever arms attached to the wheel to disengage the wheel from the hub.

U.S. Pat. No. 4,729,157 to McCue discloses another large truck wheel pulling device that uses wedges that are hammered or driven to disengage a wheel.

U.S. Pat. No. 3,689,978 to Kelso and U.S. Pat. No. 5,390,404 to Rubino et al., teach wheel pullers using a centered single screw mechanism as a wheel pulling device.

None of the prior art discloses the use of a wheel puller that pushes against the threaded wheel studs and not the hub for removal of a vehicle wheel.

SUMMARY OF THE INVENTION (DISCLOSURE OF THE INVENTION)

In accordance with the present invention, there is provided an apparatus and method of removing or breaking a motor vehicle wheel from a hub assembly by pushing against the wheel mounting studs instead of the hub. The preferred wheel puller to remove motor vehicle wheels from a hub assembly comprises a push plate comprising a surface that abuts against wheel mounting studs and at least two apertures, each for inserting a first end of a threaded grappling hook, at least two of the threaded grappling hooks, and a nut for each of the grappling hooks. The preferred apparatus further comprises a structure to keep a hub from contacting the push plate. The preferred structure to keep a hub from contacting the push plate comprises a hub aperture. The preferred at least two apertures comprise slots. The preferred apparatus further comprises a receiver structure for positioning the push plate on the hub assembly. The preferred receiver structure comprises at least one tubular member affixed to the push plate for insertion of a wheel mounting stud. An alternative receiver structure comprises a wheel mounting stud receiving channel.

The preferred method for removing a motor vehicle wheel from a hub assembly comprises the steps of positioning a push plate over wheel mounting studs on the motor vehicle wheel, affixing at least two threaded grappling hooks to the motor vehicle wheel, placing a threaded end of each threaded grappling hook into apertures in the push plate, tightening nuts on the threaded end of each threaded grappling hook to force the push plate onto the wheel mounting studs, and incrementally and alternatively tightening the nuts to pull the wheel off the hub assembly. The preferred step of positioning a push plate comprises inserting at least one wheel mounting stud into a receiver. The step of positioning a push plate can also comprise inserting the wheel mounting studs into a stud receiving channel. The preferred step of affixing the threaded grappling hooks to the motor vehicle wheel comprises inserting a hook end of the threaded grappling hook into existing apertures in the motor vehicle wheel. The preferred method further comprises providing a hub hole in the push plate to keep a hub from contacting the push plate.

A primary object of the present invention is to provide a wheel puller for uni-mount type wheels that does not push from the hub.

Another object of the invention is to provide a wheel puller that can be used on different type hubs and wheels without special adapters.

Yet another object of the invention is to provide a portable wheel puller that can be used in the field.

A primary advantage of the present invention is its portability and ease of use.

Another advantage of the present invention is that it can be used on all uni-type mount truck wheels without adapters or special fittings.

Yet another advantage of the present invention is its low cost compared to other truck wheel pullers.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention, and together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

BEST MODES FOR CARRYING OUT THE INVENTION

Figure 1:
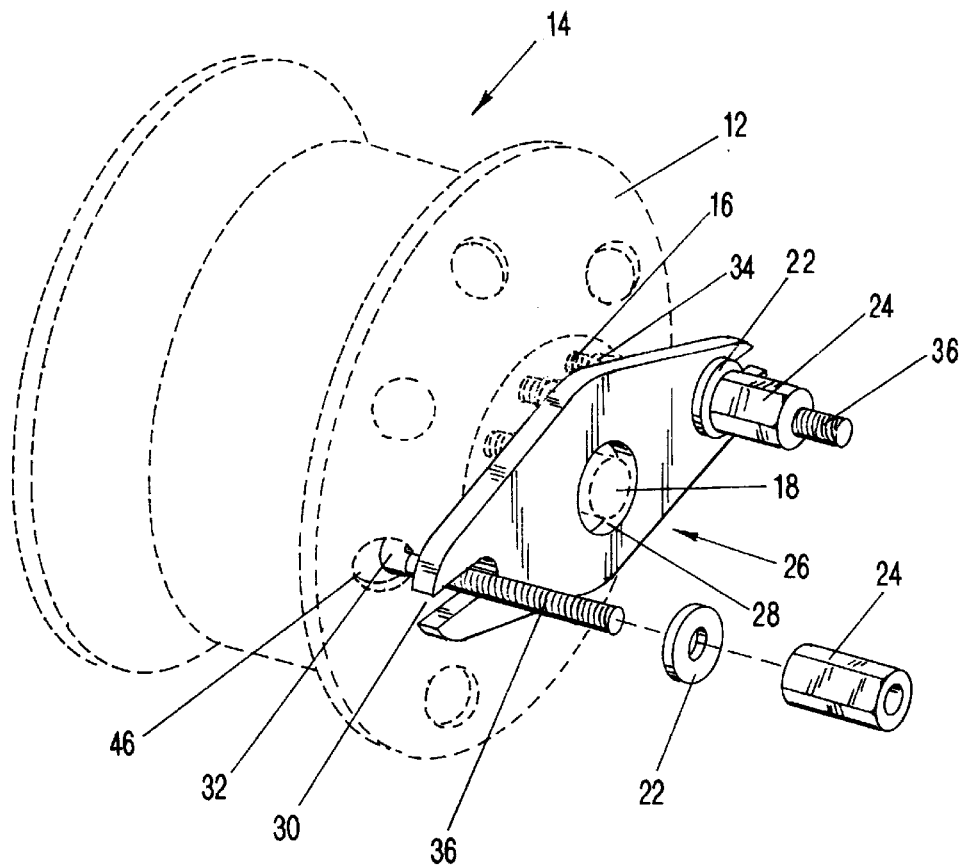
FIG. 1 is a perspective view of the preferred embodiment of the invention and method of using the invention to remove a wheel.
Figure 2:
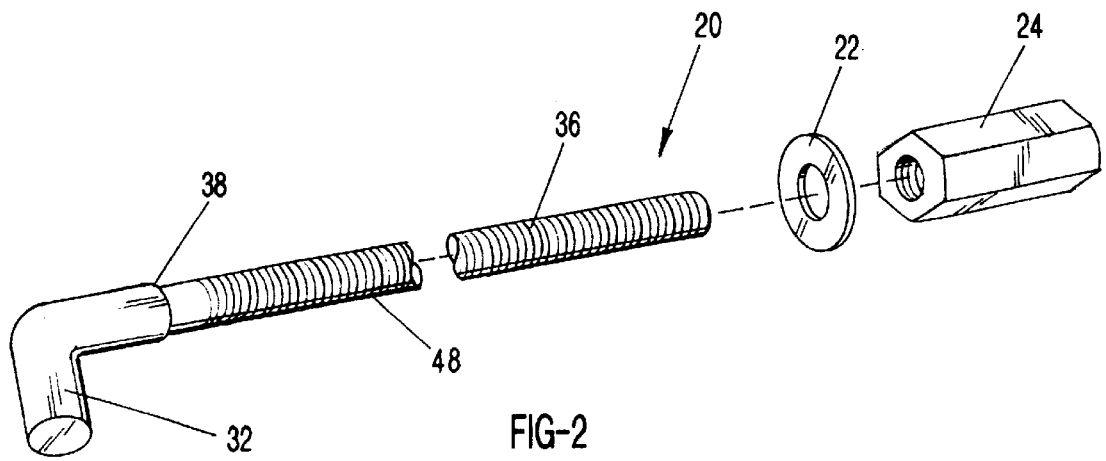
FIG. 2 shows the preferred grappling hook of the invention.
Figure 3:
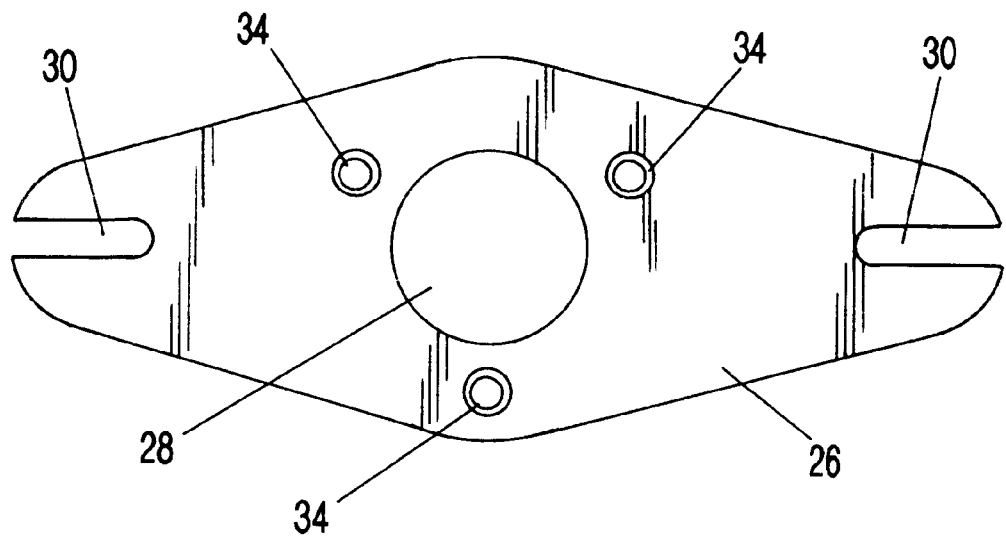
FIG. 3 depicts the preferred push plate.

The wheel pulling apparatus and method of the present invention comprises hardware components for pulling or removing uni-mount wheels from a vehicle hub. As previously discussed the present invention pushes wheel 12 from hub assembly 14 by pushing against the wheel mounting studs 16 instead of from hub 18, as shown in FIG. 1. The hole pattern and stud size for the inside wheel of truck wheels is consistent for all makes of large trucks and motor coaches. These studs 16 are usually made of hardened steel and are therefore extremely sturdy compared to a hub 18. The preferred embodiment comprises of at least two or more threaded grappling hooks 20 with washers 22 and nuts 24, as shown in FIG. 2, a push plate 26 with a hole 28 in the middle for hub 18 to slip through, slots 30 that receive hooks 32, and at least one or more receivers 34 welded to push plate 26 to receive the threaded studs 16 of hub 18, as shown in FIGS. 1 and 3. Receivers 34 are optional and are affixed to push plate 26 to keep push plate 26 in position until it is snugged up to studs 16 by tightening threaded grappling hooks 20. Push plate 26 is preferably made from a material that can withstand the pushing force against studs 16 without bending. In the preferred embodiment one-half inch steel plate was used. Push plate 26 is preferably configured as shown in FIG. 3. However push plate 26 can be in any configuration depending on the number of threaded grappling hooks 20 to be used. Slots 30 are cut out of push plate 26 as shown. Slots 30 should preferably be wide enough to allow first end 36 of threaded grappling hooks 20 to easily slide along slot 30. In addition, slots 30 should be long enough to accommodate different size and shaped apertures for grappling onto. Hole 28 in push plate 26 is also optional depending on the length of studs 16. If the length of studs 16 from the hub assembly 14 is greater than the length of hub 18, hole 28 is not necessary. Additionally, push plate 26 could be manufactured so that the surface that pushes on the studs 16 is extended or stepped up so that the hub 18 sits in a recess in the push plate 26 (not shown). As shown in FIG. 2, threaded grappling hooks 20 are preferably made from hardened steel with threads 48, at least one washer 22 and nut 24 on a first end 36 and hook 32 on a second end 38. Again referring to FIGS. 1 and 3, receivers 34 in the preferred embodiment are cylindrical pieces of steel, affixed to push plate 26, preferably by welding. Receivers 34 are larger in diameter than studs 16 and preferably are approximately one-half inches in height to keep studs 16 engaged. The preferred embodiment has three receivers 34 mounted on push plate 26, as shown. However, fewer or more receivers 34 can be used to keep push plate 26 in position.

Figure 4:
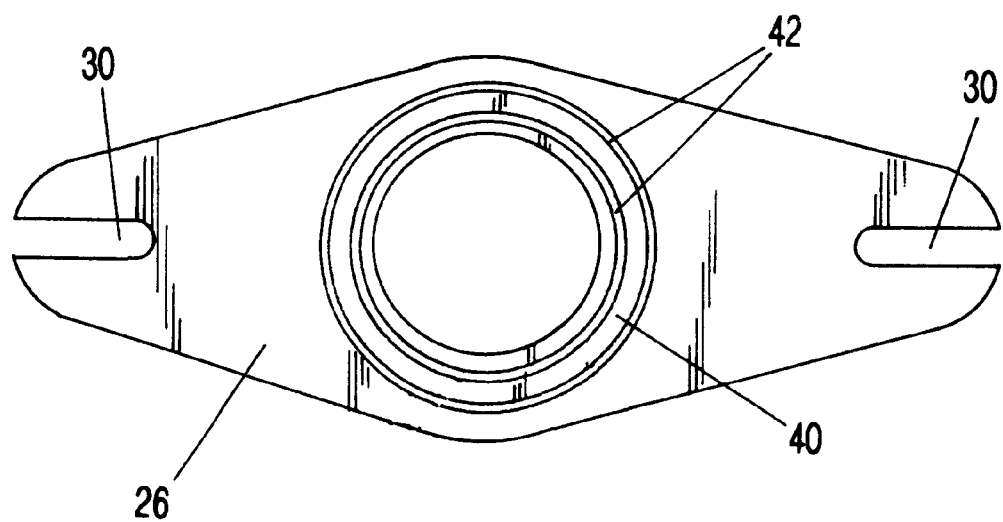
FIG. 4 shows an alternative embodiment of a push plate.

FIG. 4 shows an alternative embodiment of the invention. Circular groove 40 is affixed to push plate 26 by welding, or the like, to match the stud pattern diameter. Circular groove 40 is preferably two steel bands 42, affixed to push plate 26, with groove portion 44 wide enough to allow studs 16 to be inserted easily to keep push plate 26 in position. The remaining components are as described in the preferred embodiments.

The preferred method for removing a wheel is depicted in FIG. 1. After removing the outside wheel on a dual rim configuration (not shown), push plate 26 is placed onto studs 16 of hub assembly 14 by inserting studs 16 into receivers 34, thereby effectively establishing a position from which to work wheel 12 off the hub assembly 14. Hooks 32 from each threaded grappling hook 20 are placed through existing wheel holes 46 on wheel 12 in close relation to slots 30 in push plate 26 and hooked onto wheel 12, as shown. First end 36 of each threaded grappling hook 20 is pushed or slid through the respective slot 30 on push plate 26. Washers 22 and nuts 24 are tightened to secure each of threaded grappling hooks 20 onto wheel 12. Wheel 12 is then pulled by alternating and incremental tightening of nuts 24 to avoid binding. Once wheel 12 is broken from hub assembly 14, wheel 12 can be removed. To keep threaded grappling hooks 20 from rotating during tightening, first end 36 can be milled to flatten one or two opposite sides so that the flattened section is confined by similar sized slots 30 in push plate 26 (not shown).

The advantages the present invention has over existing wheel pullers are that it is light weight and easily transportable for use in the field. It can easily be used on any type of hub without the need of hub adapters, because it pulls from the studs and not the center of the hub. It is far less complicated to use and to manufacture. The present invention has a lower pull point closer to the face of the wheel, giving it a more direct pulling motion with greater stability. The invention does not require a large supportive frame equipped with up and down motions because it is a free hanging apparatus.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A wheel puller to remove a motor vehicle wheel from a hub assembly, said motor vehicle wheel including a plurality of holes therein, and said hub assembly including a hub and a plurality of wheel mounting studs, said wheel puller comprising: a push plate comprising a surface that abuts against said wheel mounting studs, and at least two apertures; at least two threaded grappling hooks, said grappling hooks each including a first threaded end inserted through respective aperture in said push plate, and a second hooked end adapted for insertion within said holes in said motor vehicle wheel; and a nut disposed on the threaded end of each of said grappling hooks.

2. The invention of claim 1 further comprising a means to keep said hub from contacting said push plate.

3. The invention of claim 2 wherein said means to keep said hub from contacting said push plate comprises a hub aperture in said push plate.

4. The invention of claim 1 wherein said at least two apertures comprise slots.

5. The invention of claim 1 further comprising a receiver means for positioning said push plate on said hub assembly.

6. The invention of claim 5 wherein said receiver means comprises at least one tubular member affixed to said push plate for insertion of one of said wheel mounting studs.

7. The invention of claim 5 wherein said receiver means comprises a wheel mounting stud receiving channel.

8. A method for removing a motor vehicle wheel from a hub assembly, said motor vehicle wheel including a plurality of holes therein, and said hub assembly including a hub and a plurality of wheel mounting studs, the method comprising the steps of: positioning a push plate over said wheel mounting studs of the hub assembly; affixing at least two threaded grappling hooks to the motor vehicle wheel by engaging hooked ends of said grappling hooks within respective holes in said vehicle wheel; placing a threaded end of each threaded grappling hook into a respective aperture in the push plate; tightening nuts on the threaded end of each threaded grappling hook to force the push plate against the wheel mounting studs; and incrementally and alternatively tightening the nuts to pull the wheel off the hub assembly.

9. The method of claim 8 wherein the step of positioning the push plate comprises inserting at least one of said wheel mounting studs into a receiver.

10. The method of claim 8 wherein the step of positioning the push plate comprises inserting the wheel mounting studs into a stud receiving channel on the push plate.

11. The method of claim 8 further comprising providing the hub hole in the push plate to keep a hub from contacting the push plate.

* * * * *